Figure 1:
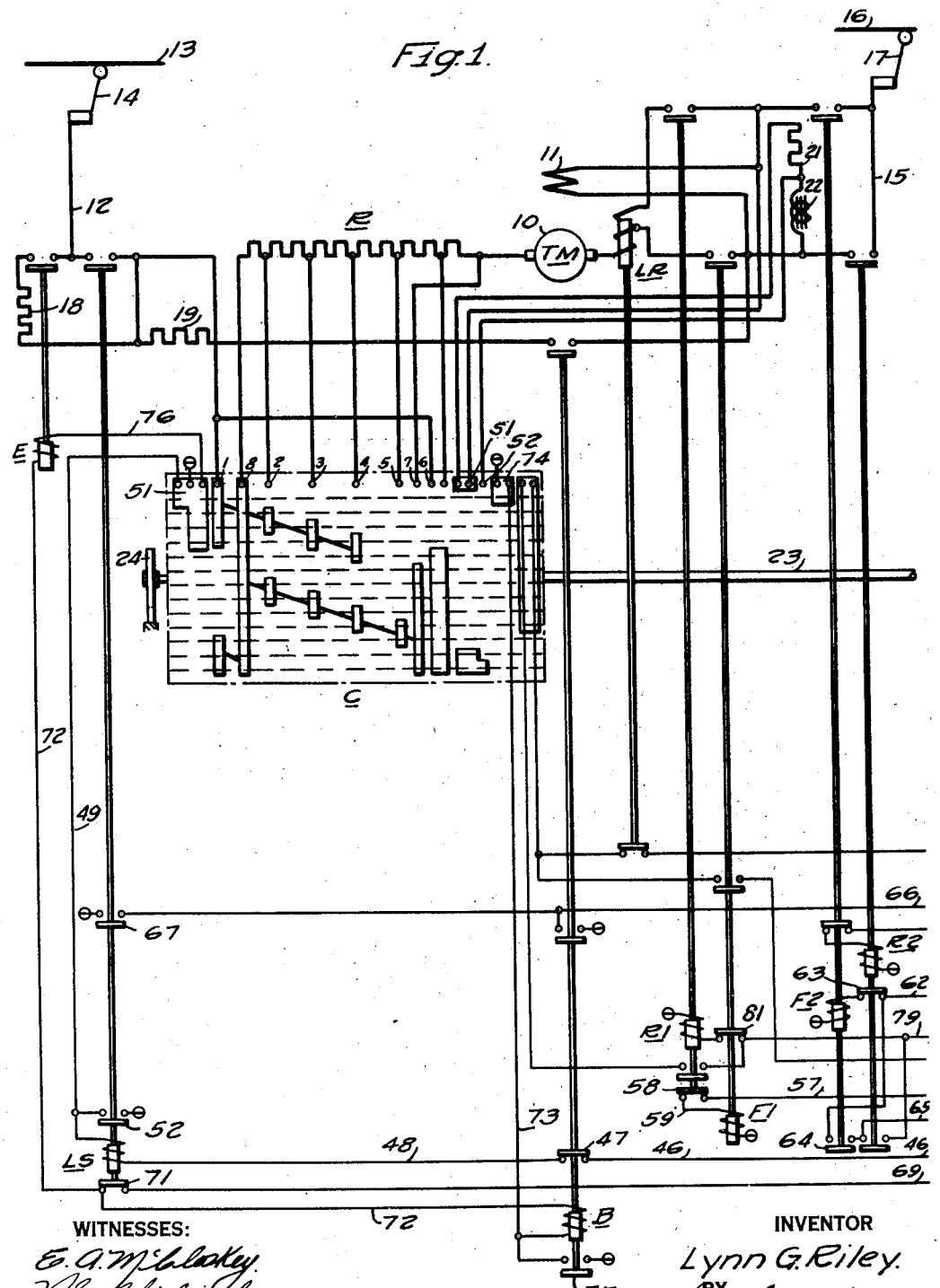

Dec. 21, 1948. L. G. RILEY 2,456,892
MOTOR CONTROL SYSTEM
Filed Oct. 29, 1943 3 Sheets-Sheet 1

WITNESSES:
E. A. M'Closkey
[signature]

INVENTOR
Lynn G. Riley.
BY [signature]
ATTORNEY

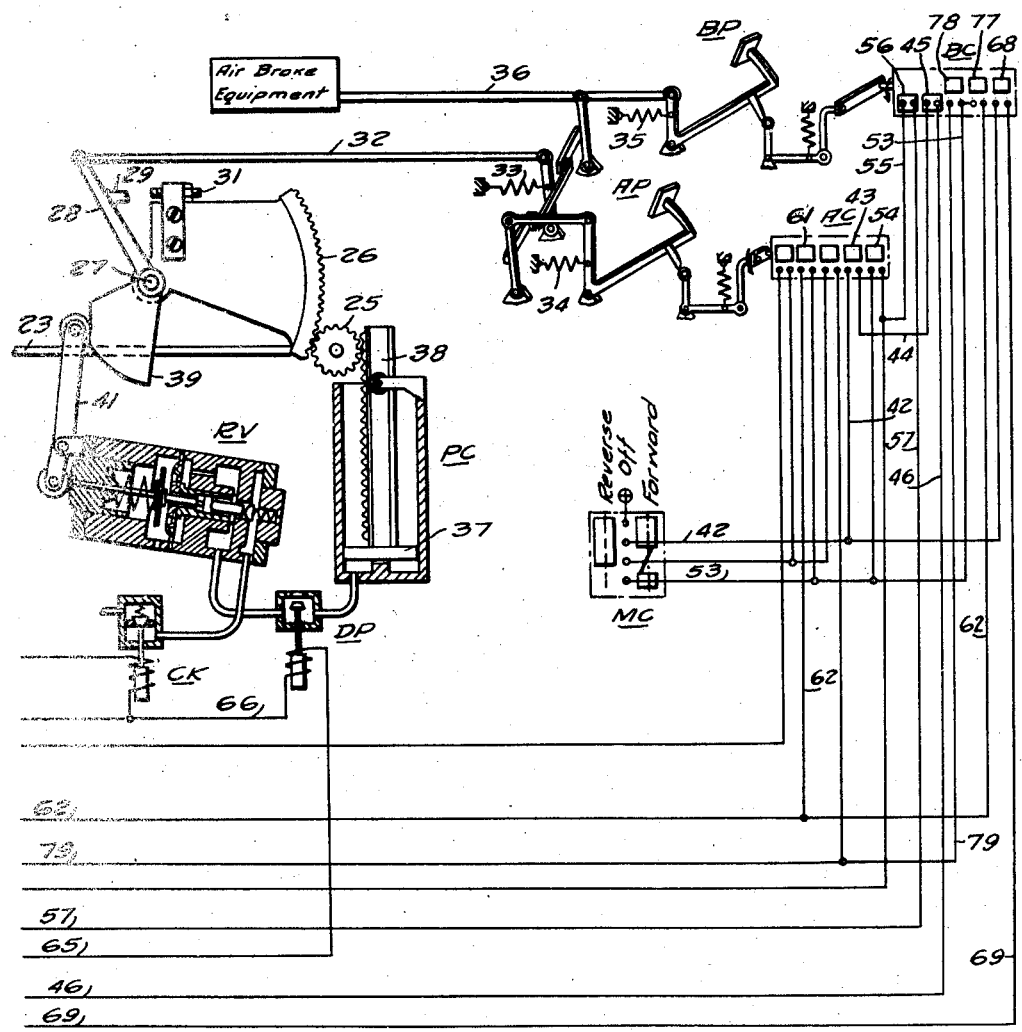

Dec. 21, 1948.  L. G. RILEY  2,456,892
MOTOR CONTROL SYSTEM
Filed Oct. 29, 1943  3 Sheets-Sheet 3
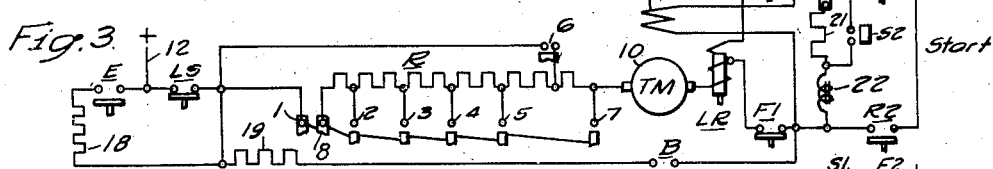
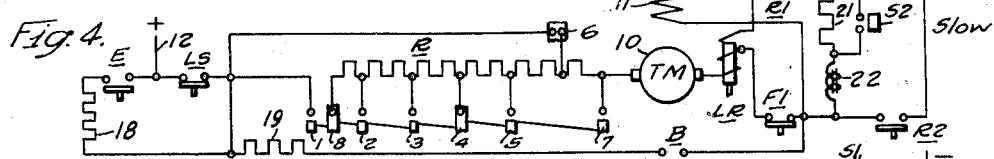
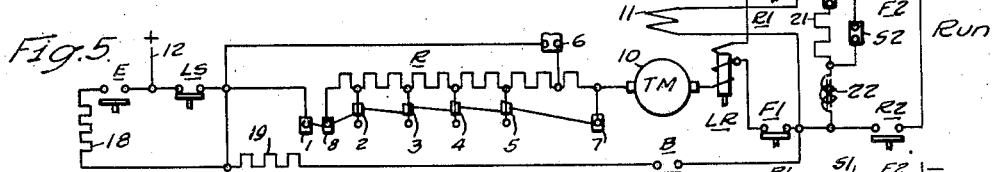
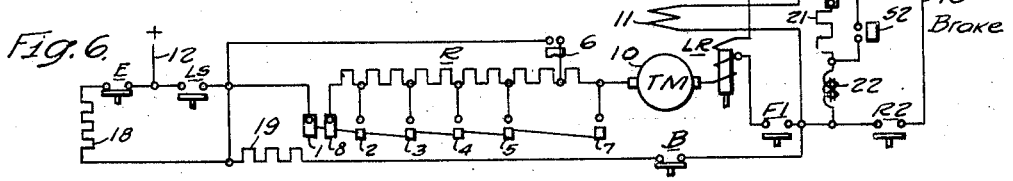
INVENTOR
Lynn G. Riley Patented Dec. 21, 1948

2,456,892

UNITED STATES PATENT OFFICE 2,456,892

MOTOR CONTROL SYSTEM

Lynn G. Riley, Pittsburgh, Pa., assignor to Westinghouse Electric Corporation, East Pittsburgh, Pa., a corporation of Pennsylvania Application October 29, 1943, Serial No. 508,265

4 Claims. (Cl. 318—259)

My invention relates, generally, to control systems and, more particularly, to systems for controlling the operation of the propelling motors of electric vehicles, such as trolley coaches and the like.

An object of my invention, generally stated, is to provide a control system which shall be simple and efficient in operation and which may be economically manufactured and installed.

A more specific object of my invention is to decrease the mounting space and the amount of equipment required for controlling the operation of an electrically propelled vehicle.

Another object of my invention is to increase the reliability of the control apparatus for an electrically propelled vehicle.

A further object of my invention is to provide for the semiautomatic operation of a motor controller by the combined forces of a foot pedal and a fluid-pressure operated device.

Still another object of my invention is to provide a simplified and improved system for controlling the application of power and dynamic braking to, and the reversing of, a traction motor.

Other objects of my invention will be explained fully hereinafter or will be apparent to those skilled in the art.

In accordance with one embodiment of my invention, both the acceleration and the dynamic braking of a traction motor are primarily controlled by a group of resistor-shunting switches which are operated by the combined forces of a foot pedal and a booster air cylinder. The operation of the switch group is controlled by the pedal at all times but the pedal supplies only a small part of the operating force. The pressure in the air cylinder is controlled by a regulating valve in direct proportion to the pedal movement.

For a fuller understanding of the nature and objects of my invention, reference may be had to the following detailed description, taken in conjunction with the accompanying drawing, in which:

Figures 1 and 1A, when combined, constitute a diagrammatic view of a control system embodying the principal features of my invention;

Fig. 2 is a chart showing the sequence of operation of part of the apparatus illustrated in Figs. 1 and 1A; and Figs. 3 to 6, inclusive, are simplified circuit diagrams showing various stages in the operating sequence.

Referring to the drawings, and particularly to Figs. 1 and 1A, the system shown therein comprises a traction motor TM having an armature winding 10 and a series field winding 11; a line switch LS for connecting the motor TM to a power conductor 12 which may be energized from a trolley conductor 13 through a current collecting device 14; a plurality of reversing switches F1, F2, R1, and R2 for controlling the direction of operation of the motor TM and also connecting the motor to a power conductor 15 which is connected to a trolley conductor 16 through a current collecting device 17; a switch B which cooperates with certain of the reversing switches to establish dynamic braking connections for the motor TM, and a switch E which connects the field winding 11 of the motor TM to the power conductor 12, thereby exciting the motor field during dynamic braking. A resistor 18 is connected in the excitation circuit for the field winding 11 and a resistor 19 is connected in both the field excitation circuit and the dynamic braking circuit for the motor TM.

The motor current is controlled, both during acceleration and dynamic braking, by a resistor R which is shunted from the motor circuit step-by-step by a controller C which is provided with a plurality of contact members 1 to 8, inclusive, for shunting the resistor R. The controller C is also provided with contact members S1 and S2 for shunting the field winding 11 through a resistor 21 and a reactor 22 in a manner well known in the art. The controller C is actuated in one direction by a shaft 23 and is returned to the position shown in the drawing by a spiral spring 24.

As shown in Fig. 1A, the controller shaft 23 is driven by a pinion 25 which, in turn, is driven by a gear sector 26. The sector 26 is rotatably mounted on a shaft 27 to which is secured an arm 28 having a projection 29 thereon for engaging an adjustable screw 31 on the gear sector 26 when the arm 28 is moved through a predetermined distance. The arm 28 is actuated by a rod 32 which may be moved in one direction by either an accelerating pedal AP or a braking pedal BP. When pressure on the pedals is released, the rod 32 is returned to the position shown in the drawing by a spring 33 and the pedals AP and BP are returned to their normal positions by springs 34 and 35, respectively. The pedal BP may also be connected to the air brake equipment for the vehicle by means of a rod 36.

In order to assist in the operation of the controller C, a fluid-pressure operated piston 37 is disposed in a cylinder PC and connected to the pinion 25 by means of a rack 38. The pressure in the cylinder PC is controlled by a regulating valve RV which may be adjusted by a cam 39 secured to the arm 28. The cam 39 actuates a pivotally mounted follower 41 which, in turn, adjusts the pressure maintained in the cylinder PC by the regulating valve RV. Thus the pressure maintained in the cylinder PC is in direct proportion to the movement of either the accelerating pedal AP or the braking pedal BP.

In view of the lost motion connection between the arm 28 and the gear sector 26, it will be seen that the regulating valve RV is adjusted to establish a predetermined pressure in the cylinder PC prior to the movement of the gear sector 26 to operate the controller C. Thus the major portion of the energy required for operating the controller C is supplied by the piston 31, and the manually operated pedals are normally utilized for controlling the movement of the controller.

An electrically operated check valve CK is provided in the supply line for the regulating valve RV. The operation of the check valve CK is controlled by a limit relay LR, the actuating coil of which is connected in the traction motor circuit and is, therefore, responsive to the motor current during both acceleration and dynamic braking. The actuating coil of the relay LR is divided into two sections, only one of which is utilized during acceleration and both of which are utilized during dynamic braking, thereby changing the calibration of the relay LR during braking. Thus if the motor current exceeds a predetermined amount the supply of pressure fluid to the cylinder PC is cut off by the check valve CK and the controller C can then be operated only by the manual pedals. This arrangement provides a means for temporarily increasing the load on the motor TM during emergency conditions.

As described in the copending application of W. M. Hutchison, Serial No. 508,264, filed October 29, 1943, in order to permit the controller C to be returned rapidly to the off position when the manually operated pedals are released, an electrically operated dump valve DP is provided in the fluid line between the regulating valve RV and the cylinder PC. The operation of the dump valve DP is so controlled by interlocking means provided on the switches LS and B that the valve is opened to permit the rapid exhaustion of the pressure fluid from the cylinder PC when these switches are opened at the end of the accelerating or the braking cycles.

A manually operable controller MC is provided for controlling the operation of the reversing switches and for controlling the supply of control current to a controller drum AC which is actuated by the accelerating pedal AP and a controller drum BC which is actuated by the braking pedal BP. The controllers AC and BC are utilized to control the operation of the control apparatus during accelerating and braking, respectively. They are interlocked to prevent improper operation of the equipment in the event that both the accelerating and the braking pedals are depressed simultaneously.

In order that the functioning of the foregoing apparatus may be more clearly understood, the operation of the system will now be described in more detail. Assuming that it is desired to accelerate the vehicle in a forward direction, the controller MC is actuated to the forward position and the pedal AP is depressed, thereby moving the arm 28 to adjust the setting of the regulating valve RV and also to operate the gear sector 26 to drive the pinion 25 in cooperation with the fluid-actuated piston 37 in the cylinder PC.

When the pedal AP is depressed, the controller AC is actuated to establish an energizing circuit for the actuating coil of the switch LS which may be traced from positive at the controller MC through conductor 42, a contact segment 43 on the controller AC, conductor 44, a contact segment 45 on the controller BC, conductor 46, an interlock 47 on the switch B, conductor 48, the actuating coil of the switch LS, conductor 49 and a contact segment 51 on the controller C to negative. A holding circuit for the switch LS is established through an interlock 52 upon the closing of the switch.

At this time the reversing switches F1 and F2 are also closed. The energizing circuit for the switch F1 extends from the controller MC through conductor 53, a contact segment 54 on the controller AC, conductor 55, a contact segment 56 on the controller BC, conductor 57, an interlock 58 on the switch R1, conductor 59 and the actuating coil of the switch F1 to negative. The energizing circuit for the switch F2 extends from the conductor 53 through a contact segment 61 on the controller AC, conductor 62, an interlock 63 on the switch R2 and the actuating coil of the switch F2 to negative. At this time the actuating coil for the dump valve DP is also energized through a circuit which extends from the conductor 62 through an interlock 64 on the switch F2, conductor 65, the actuating coil of the valve DP, conductor 66, and an interlock 67 on the switch LS to negative.

The closing of the switches LS, F1, and F2 connects the traction motor TM across the power conductors 12 and 15 in series-circuit relation with the resistor R. As explained hereinbefore, the operation of the pedal AP results in the advancement of the controller C, thereby shunting the resistor R from the motor circuit step-by-step to accelerate the motor TM. The acceleration rate depends upon the distance to which the pedal AP is advanced, thereby adjusting the regulating valve RV. The maximum rate is determined by the setting of the limit relay LR, which, as explained hereinbefore, controls the operation of the check valve CK to interrupt the flow of air, or other pressure fluid, to the booster cylinder PC. When the check valve CK is closed the controller C can be advanced only by excessive pedal pressure.

As indicated in the sequence chart shown in Fig. 2 and the schematic diagrams shown in Figs. 3, 4, and 5, the resistor R is shunted from the motor circuit by the advancement of the controller C through the various operating positions. The field shunting contact members S1 and S2 are closed at the end of the accelerating cycle to increase the motor speed still further in a manner well known in the art.

Any desired intermediate speed can be selected by holding the accelerating pedal AP at a position corresponding to the desired speed. The regulating valve RV will function to so control the pressure in the cylinder PC that the controller C is not actuated beyond the position corresponding to that of the pedal AP.

If it is desired to decelerate the vehicle, the pedal AP is released and the pedal BP depressed. As explained hereinbefore, when the pedal AP is released the controller AC is returned to the position shown in the drawings, and the switches LS, F1, and F2 are opened to disconnect the motor from the power circuit. Furthermore, the opening of the switch LS deenergizes the actuating coil for the dump valve DP, thereby permitting the controller C to be returned to its initial position by the spring 24.

The operation of the brake pedal BP actuates the rod 32 and the arm 28 in the manner hereinbefore described to adjust the regulating valve RV. The pedal BP also operates the controller drum BC to close the switches B, E, F2 and R1 to establish a dynamic braking circuit for the motor TM.

The energizing circuit for the switch B may be traced from controller MC, through conductor 42, a contact segment 68 on the controller BC, a conductor 69, an interlock 71 on the switch LS, conductor 72, the actuating coil of the switch B, conductor 73, and a contact segment 74 on the controller C to negative. A holding circuit for the switch B is established through an interlock 75 upon the closing of the switch B.

The energizing circuit for the switch E extends from the conductor 72, through the actuating coil of the switch E, conductor 76, and the contact segment 51 on the controller C to negative. The energizing circuit for the switch F2 extends from the conductor 53 through a contact segment 77 on the controller BC, conductor 62, the interlock 63 on the switch R2 and the actuating coil of the switch F2 to negative. The energizing circuit for the switch R1 extends from the conductor 53 through a contact segment 78 on the controller BC, conductor 79, an interlock 81 on the switch F1 and the actuating coil of the switch R1 to negative.

As shown in Figs. 1 and 6, the closing of the switches B and R1 establishes a dynamic braking circuit for the motor TM through the resistors R and 19. This dynamic braking circuit includes the series field winding 11 and both sections of the actuating coil of the limit relay LR. The field winding 11 is also connected across the power conductors 12 and 15 by the closing of the switches E and F2, thereby separately exciting the field winding 11 and ensuring a prompt building up of the dynamic braking effect. The resistors 18 and 19 are included in the excitation circuit for the field winding 11.

The controller C is advanced by the fluid-pressure device PC under the control of the braking pedal BP in a manner similar to the operation under the control of the accelerating pedal AP. As the controller C is advanced, the resistor R is shunted from the motor circuit step-by-step in the same manner as during acceleration. The maximum rate of braking is determined by the limit relay LR which controls the operation of the check valve CK in the manner hereinbefore described. The braking pedal BP may be released at the end of the braking cycle and the controller C then returned to its initial position to begin an accelerating cycle.

From the foregoing description it is apparent that I have provided a semiautomatic control system which is suitable for controlling the operation of electrically propelled vehicles, and which reduces the physical effort required of the operator in controlling the vehicle. Furthermore, the apparatus required for controlling the vehicle is reduced by combining the function of certain of the switches during the reversing and braking operations in the manner described. The equipment required is of a type previously utilized on vehicles having air brake equipment and which has proven to be reliable in operation.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a motor control system, in combination, switching means for connecting the motor to a power conductor to accelerate the vehicle, reversing switches for controlling the direction of operation of the motor, additional switching means cooperating with said reversing switches to establish dynamic braking connections for the motor, a controller for controlling the motor current during both acceleration and dynamic braking, and relay means responsive to the motor current for controlling the operation of said controller, the operating characteristics of said relay means being changed by the operation of said reversing switches.

2. In a motor control system, in combination, switching means for connecting the motor to a power conductor to accelerate the vehicle, a plurality of independently operable reversing switches for controlling the direction of operation of the motor, additional switching means cooperating with part of said reversing switches to establish dynamic braking connections for the motor, a controller for controlling the motor current during both acceleration and dynamic braking, and a relay responsive to the motor current for controlling the operation of said controller, the operating characteristics of said relay being changed by the establishing of said dynamic braking connections.

3. In a motor control system, in combination, switching means for connecting the motor to a power conductor to accelerate the vehicle, reversing switches for controlling the direction of operation of the motor, additional switching means cooperating with said reversing switches to establish dynamic braking connections for the motor, control means for controlling the motor current during both acceleration and dynamic braking, a relay responsive to the motor current for controlling the operation of said control means, and means on said relay for changing its operating characteristics when the dynamic braking connections are established.

4. In a motor control system, in combination, switching means for connecting the motor to a power conductor to accelerate the vehicle, reversing switches for controlling the direction of operation of the motor, a manually operable controller for controlling the operation of said reversing switches during acceleration of the vehicle, additional switching means cooperating with said reversing switches to establish dynamic braking connections for the motor, a braking controller for controlling the operation of said additional switching means and said reversing switches during dynamic braking of the vehicle, control means for controlling the motor current during both acceleration and dynamic braking, a relay responsive to the motor current for controlling the operation of said control means, and means on said relay for changing its operating characteristics when the dynamic braking connections are established.

LYNN G. RILEY.

(References on following page)

REFERENCES CITED

The following references are of record in the file of this patent:

UNITED STATES PATENTS

| Number | Name | Date |
|---|---|---|
| 789,754 | Napier | May 16, 1905 |
| 795,024 | Case | July 18, 1905 |
| 1,005,420 | Darlington | Oct. 10, 1911 |
| 1,352,483 | Smith | Sept. 14, 1920 |
| 1,501,159 | Bartholomew | July 15, 1924 |
| 1,837,465 | McConkey | Dec. 22, 1931 |
| 1,894,098 | Janisch | Jan. 10, 1933 |
| 1,933,231 | Stevens | Oct. 31, 1933 |
| 2,000,727 | Wilby | May 7, 1935 |
| 2,165,119 | Wunsche | July 4, 1939 |